United States Patent
Hsu

(10) Patent No.: US 8,054,377 B2
(45) Date of Patent: Nov. 8, 2011

(54) DOCUMENT PROCESSING DEVICE WITH PICTURE-TAKING, VIDEO AND AUDIO RECORDING, SCANNING AND PROJECTING FUNCTIONS

(75) Inventor: Chun Chieh Hsu, Hsichih (TW)

(73) Assignee: CRS Electronic Co., Ltd., Taipei Hsien (TW)

( * ) Notice: Subject to any disclaimer, the term of this patent is extended or adjusted under 35 U.S.C. 154(b) by 265 days.

(21) Appl. No.: 12/453,518

(22) Filed: May 14, 2009

(65) Prior Publication Data

US 2010/0290717 A1    Nov. 18, 2010

(51) Int. Cl.
*H04N 5/225* (2006.01)
(52) U.S. Cl. .................................... 348/373; 353/119
(58) Field of Classification Search ............ 348/373, 348/374, 375; 248/177.1, 918, 187.1; 358/449, 358/450; 353/71, 79, 119
See application file for complete search history.

(56) References Cited

U.S. PATENT DOCUMENTS 5,933,191 A * 8/1999 Ariga et al. ................ 348/373
2003/0133013 A1* 7/2003 Maeda et al. .............. 348/143

* cited by examiner

*Primary Examiner* — Nelson D. Hernández Hernández
(74) *Attorney, Agent, or Firm* — Rosenberg, Klein & Lee

(57) ABSTRACT

The present invention is to provide a document processing device with picture-taking, video and audio recording, scanning and projecting functions, which mainly is including a set of base composed of a left and a right base bodies, a vertical rack bar able to be insert-put on the left and right base bodies, a horizontal rack bar pivot-connected on top of the vertical rack bar, a main machine body pivot-set in the vertical rack bar elements. The said main machine body has an optical lens and is set with a microphone and a light compensator. The device of present invention can be provided for putting the ordinary document data on the base. The data on the documents can be transformed into editable files by utilizing the optical lens inside the main machine body to take the pictures and through the recognizing software. Furthermore, it can record the audio or video in accordance with selected action processes through the main machine body. Simultaneously, the main machine body can further provide for connecting externally with the computers to proceed the image projecting.

3 Claims, 5 Drawing Sheets

DOCUMENT PROCESSING DEVICE WITH PICTURE-TAKING, VIDEO AND AUDIO RECORDING, SCANNING AND PROJECTING FUNCTIONS

FIELD OF THE INVENTION

The present invention is related to a document processing device with picture-taking, video and audio recording, scanning and projecting functions, which can cooperate with a computer to proceed the access of document data or video and audio such that the said device can have multiple functions and better practicability

BACKGROUND OF THE INVENTION

Ordinarily, a known method to duplicate the document data generally is to utilize a copy machine or traditional scanner to process. And, these machines have their own different processing performance. For example, the copy machine can directly reproduce the required copies of document data in an extremely fast speed. For reproducing the documents, the efficiency of these machines is extremely high. But their disadvantages are that the volume and weight of the machines and tools are larger and cannot be hand-carried. As for the scanner, it needs to cooperate with a computer then it can proceed the duplicating of paper document data. And, all the aforementioned machines and tools are not equipped with other functions; they thus have no particularity or competitiveness while usage.

SUMMARY OF THE INVENTION

The main object of present invention is to design a document processing device with picture-taking, video and audio recording, scanning and projecting functions, which is including a base, a vertical rack bar, a horizontal rack bar and a main machine body. The main machine body has an optical lens and is set with a microphone and a light compensator for the provision of putting the ordinary documents on the base. The data on the documents can be transformed into editable files by utilizing the optical lens inside the main machine body to take the pictures. It can further record the audio or video in accordance with selected action processes through the main machine body. Simultaneously, the main machine body can further provides for insert-putting the memory cards or connecting externally with the computers to proceed the image projecting such that the said device can have multiple functions and better practicability.

Referring to the drawings, the characteristics and effectiveness of the present invention now will be described as follows.

DETAILED DESCRIPTION OF THE PREFERRED EMBODIMENT

Figure 1:
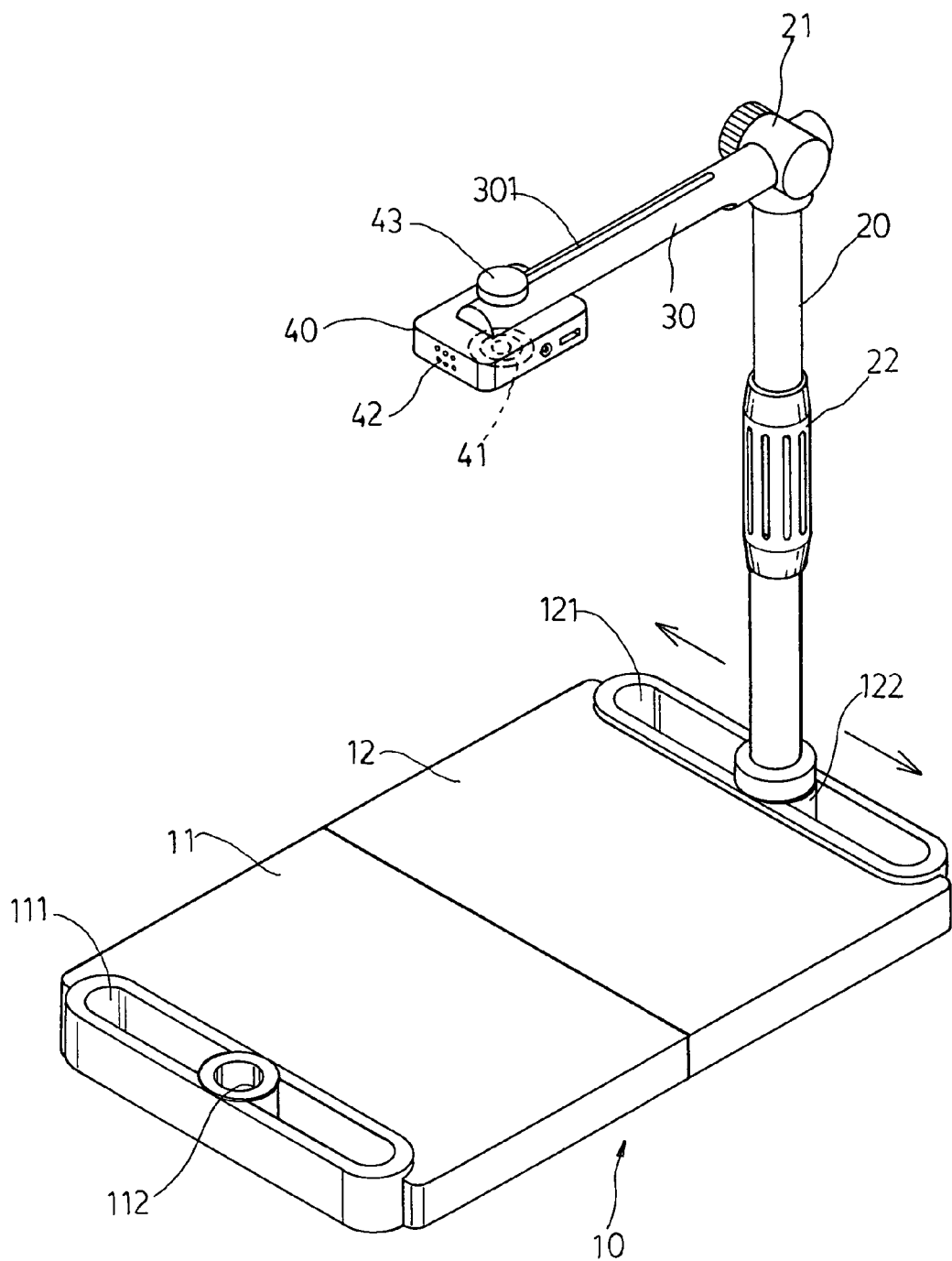
FIG. 1 is a three-dimensional outside appearance drawing of the present invention.

The present invention is to provide a document processing device with picture-taking, video and audio recording, scanning and projecting functions, as shown in FIG. 1, which is including a base 10 that is composed of a left base body 11 and a right base body 12 pivot-connected against each other on one side and formed a foldable shape with long troughs 111 and 121 each separately set on another sides of the left base body 11 and right base body 12 and set with support-laying sleeves 112 and 122 capable of shifting in the troughs. A vertical rack bar 20 is set with an adjusting sleeve body 22 having pivot-connecting head 21 on its top and having its bottom end capable of being insert-put in the support-laying sleeves 112, 122 on the left base body 11 or and right base body 12. A horizontal rack bar 30 has its one end pivot-connected with the pivot-connecting head 21 of the vertical rack bar and open-set with a grooved rail 31 on the bar body. And a main machine body 40 is set with an optical lens 41 and further set with a microphone 42 and a light compensator, and set with an adjusting bolt knob 43 on its back to pivot-connect with a grooved rail 31 on the vertical rack bar 30.

Figure 2:
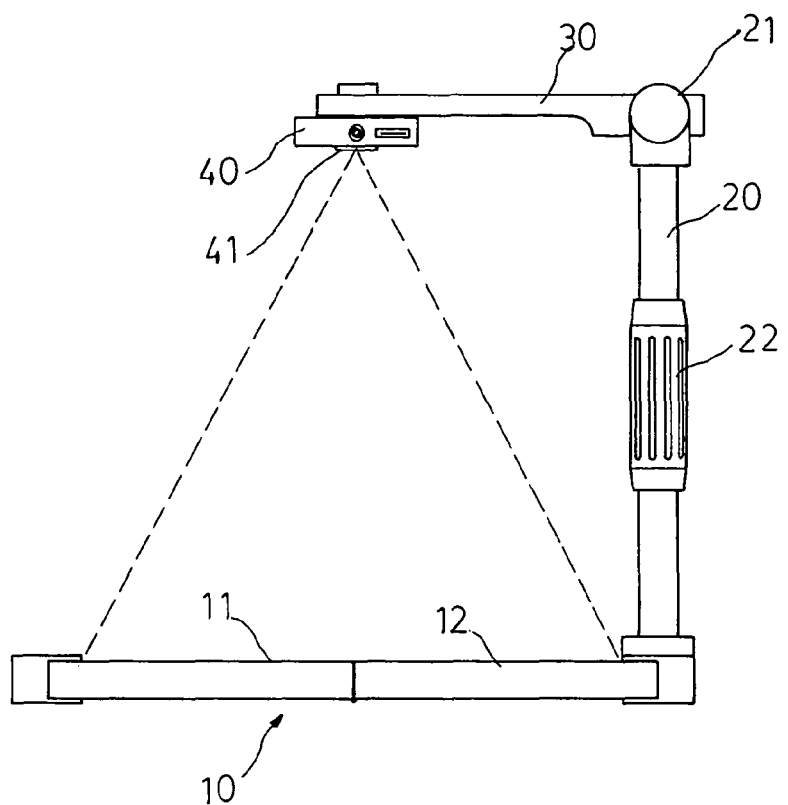
FIG. 2 is an embodiment of the present invention while performing the picture-taken operation of documents.

Referring to FIGS. 1 and 2. The left base body 11 and right base body 12 of base 10 of the present invention are folded to a maximum area. The vertical rack bar 20 is insert-put in the support-laying sleeves 122 of right base body 12, an adjusting sleeve body 22 is utilized to be adjusted to be extended to a longest shape, and can move along with the support-laying sleeves 122 to its optimum location inside the trough 121. The document data (such as the A4 papers ordinarily seen) can immediately be put on the base 10 to take pictures by utilizing the optical lens 41 of main machine body 40, and the images gotten can be transformed into Word-Excel or PDF, etc. editable files through the recognizing software for convenient usage. And, the main machine body 40 can further be connected externally with the computer to obtain the purpose of fast and direct storage.

Figure 3:
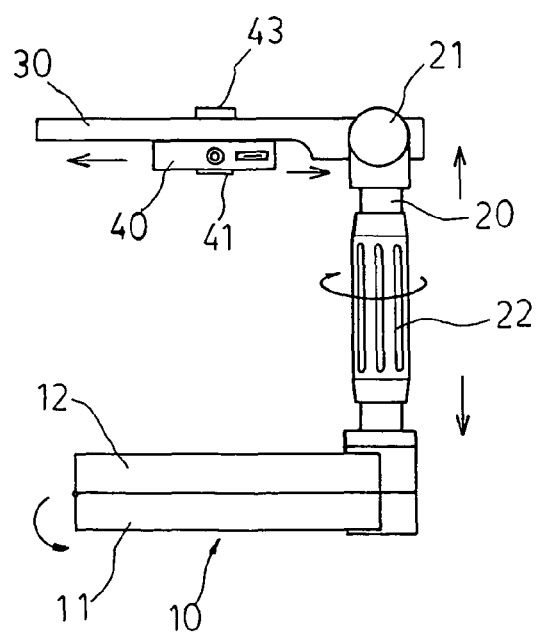
FIGS. 3 and 4 are embodiments of the present invention while performing the adjustment operation.
Figure 4:
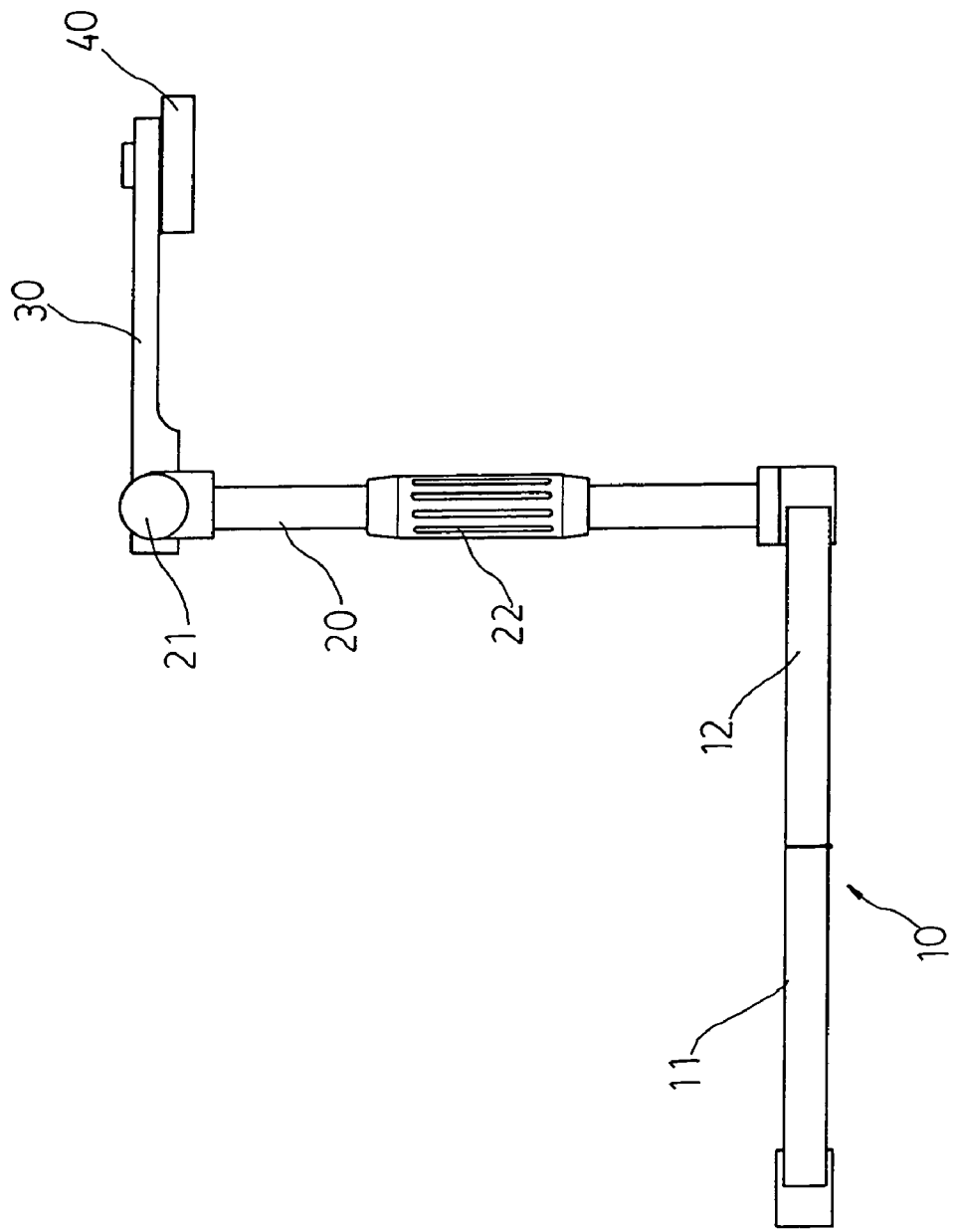

Referring to FIGS. 1 and 3. The left base body 11 and right base body 12 of base 10 in the present invention can be folded to a smaller area, wherein the vertical rack bar 20 can utilize an adjusting sleeve body 22 to adjust and shrink to a shorter shape, and the main machine body 40 can utilize an adjusting bolt knob 43 to be shifted on the groove rail 31 of horizontal rack bar 30 to its optimum location for the provision of proceeding the picture-taking function.

Referring to FIGS. 1 to 4. The horizontal rack bar 30 of present invention can be rotated 180 degrees horizontally though the pivot-connecting head 21 on the vertical rack bar 20 to cooperate with other requests in the picture-taking operation. For example, certain-selected action processes can be video-recorded and the audio recording can proceed through the microphone 42.

Figure 5:
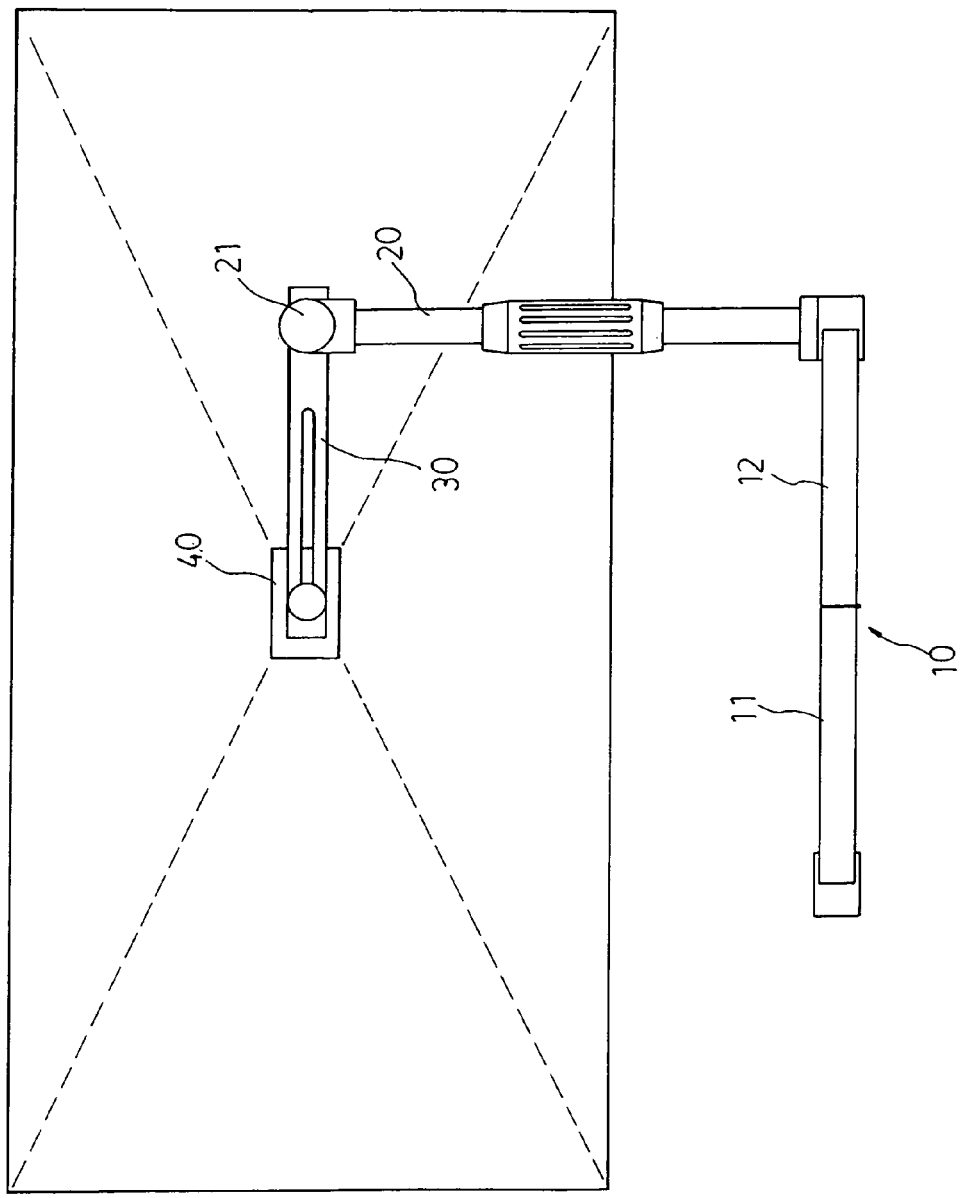
FIG. 5 is an embodiment of the present invention while performing the projection operation.

FIG. 5 is an embodiment of the present invention illustrating the document processing device performing the projection operation. The horizontal rack bar 30 of present invention can be also rotated on the pivot-connecting head 21 of vertical rack bar 20 such that the lens 41 of main body 40 faces the area expected to be displayed (such as white curtain or white board) then proceeds the image projecting by connecting externally with the computers to proceed the image projecting. And, it can also utilize the picture-taking of optical lens 41 to provide the picture-taking or video-recording functions for recording directly the contents of lecturers written on the white board. And, it is progressed a lot comparing with the known technologies.

Figure 6:
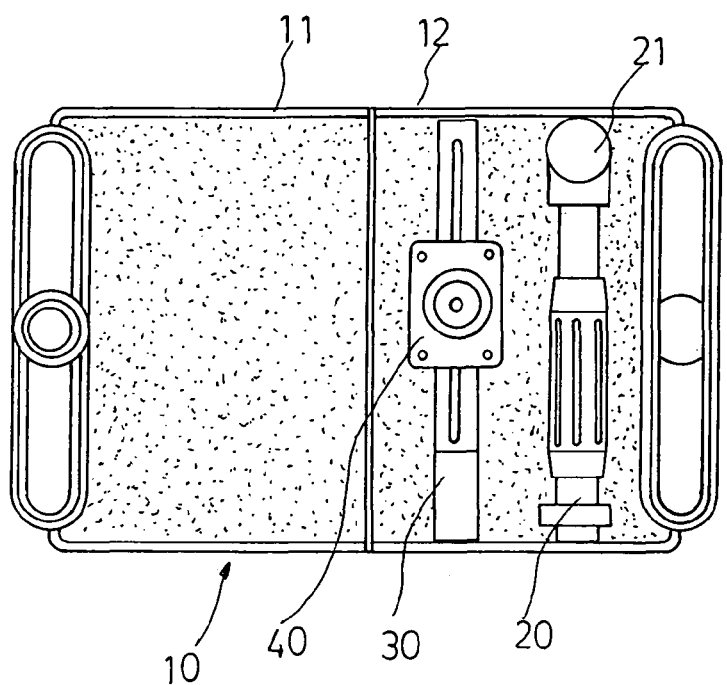
FIGS. 6 and 7 are embodiments of the present invention while being dissembled for storage.
Figure 7:
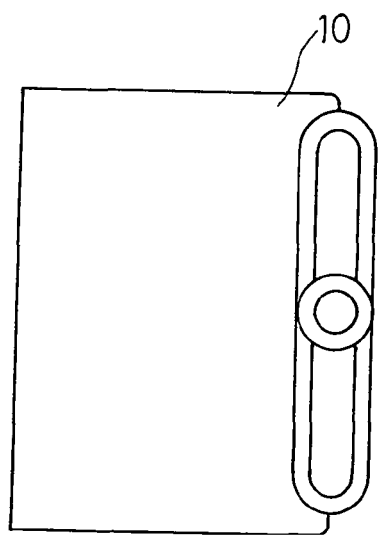

FIGS. 6 and 7 are embodiments of the present invention while the document processing device is dissembled for storage. The vertical rack bar 20 and horizontal rack bar 30 of present invention can be dissembled easily. And, the left base body 11 and right base body 12 are trough shapes and paved with soft layers to form a rotable-liftable suitcase shape for putting the vertical rack bar 20 and horizontal rack bar 30. Through this multiple-functional design, it can replace the auto-copying white board, copy machine and scanner. And, it is small in volume and easily dissembled and is able to be receive-laid inside the machine base for convenient carrying, it thus achieves the practicability and progressiveness.

Therefore, the present invention obviously is equipped with the conditions of patent act. And it is to be understood that any modified design according to the merit of the present invention will be still claimed in this application.

I claim:

1. A document processing device with picture-taking, video and audio recording, scanning and projecting functions including:
    a base, composed of a left base body and a right base body pivot-connected against each other on one side and formed a foldable shape, each is set with a long trough on another side of the left base and right base bodies, and both set with a support-laying sleeve in the long trough capable of shifting in said long trough;
    a vertical rack bar, set with a pivot-connecting head on top of the bar body and with its bottom end configured to be insert-put in the support-laying sleeves on the left and right base bodies; a horizontal rack bar, having its one end pivot-connected with the pivot-connecting head on top of the vertical rack bar, open-set with a grooved rail on the bar body; and
    a main machine body, having an optical lens and is further combined with a microphone and a light compensator, cooperate-set with an adjusting bolt knob on its back to pivot-connect with the grooved rail on the vertical rack bar.

2. A document processing device with picture-taking, video and audio recording, scanning and projecting functions according to claim 1, wherein the vertical rack bar is set with an adjusting sleeve body in the middle of bar body for adjusting its height.

3. A document processing device with picture-taking, video and audio recording, scanning and projecting functions according to claim 1, wherein the angle and location of horizontal rack bar pivot-connected with the pivot-connecting head of vertical rack bar can be adjusted and varied.

* * * * *